May 23, 1961 A. DIXON ET AL 2,984,903
BRAZING ALLOY AND ULTRASONIC PROCESS FOR USING THE SAME
Filed Dec. 6, 1957

WITNESSES
Edwin C. Bassler
Raymond T. Majesko

INVENTORS
Austin Dixon &
James R. Spierto
BY
Frederick Shapoe
ATTORNEY

United States Patent Office 2,984,903
Patented May 23, 1961

2,984,903
BRAZING ALLOY AND ULTRASONIC PROCESS FOR USING THE SAME

Austin Dixon, Westmoreland City, and James R. Spierto, Monroeville, Pa., assignors to Westinghouse Electric Corporation, East Pittsburgh, Pa., a corporation of Pennsylvania Filed Dec. 6, 1957, Ser. No. 701,233

4 Claims. (Cl. 29—502)

This invention relates to a brazing alloy, a method for joining members of metals and alloys, and a soldering device.

The joining of enameled wire conductors by solders, especially enameled aluminum wire conductors, has in the past presented quite a metallurgical problem. In the process of applying either a low temperature solder or a high temperature brazing alloy to aluminum members for the purpose of joining the same to another aluminum member or to a copper member, the presence of both surface oxides or other organic materials on the aluminum member is detrimental to its bonding capabilities. This is due to the fact that the highest temperature attained by a low temperature solder is insufficient to remove the enamel by pyrolysis from the surface and neither a low or a high temperature solder will remove the oxides, thus resulting in a very weak bond or none at all between the solder and the aluminum. A hard solder or brazing alloy with a melting point range between 700° F. and 950° F. will only decompose the aluminum oxide when a strong flux is applied, and thus produce a high quality joint with the members being united.

The same high temperature combined with high frequency mechanical vibrations is required for the heretofore mentioned enameled aluminum wire for the purpose of removing said enamel, which cannot be dissolved at lower temperatures, and in the same operation to unite said aluminum member to another aluminum member or to a copper member.

The need for such a brazing alloy is apparent with the prevailing impetus for the use of aluminum conductors in electrical products such as motors, generators and transformers.

Therefore, it is an object of this invention to provide an alloy suitable for ultrasonic brazing of metals and alloys, the alloy comprising predetermined proportions of copper, phosphorus, silver, zinc and aluminum.

A further object of this invention is to provide a process for joining members composed of metals and alloys melting above 950° F., by applying thereto an alloy of predetermined proportions of copper, phosphorus, silver, zinc and aluminum while imparting ultrasonic vibrations.

A still further object of this invention is to provide a soldering device suitable for joining members by application of simultaneous high frequency mechanical vibrations and a molten brazing alloy of specified composition.

Other objects of the invention will in part be obvious and will in part appear hereinafter.

For a better understanding of the nature and objects of the invention, attention is directed to the accompanying drawing, in which.

Broadly, the invention relates to a method for uniting members of metals and alloys of any shape or form such as rods, wires, bars, sheet, etc., by applying to the meeting surfaces of the brazing alloy members a composition to be set forth hereinafter, eliminating the use of any flux, said brazing alloy being molten at a temperature of between 700° F. and 950° F., in combination with high frequency mechanical vibrations of between 9000 and 60,000 cycles per second to produce a coated joint which, upon cooling, solidifies and joins the members into a unitary structure.

Particularly, the invention relates to a brazing alloy comprising approximately from 2 to 15% by weight of copper, from 3 to 7% by weight of phosphorus, from 2 to 10% by weight of silver, from 45 to 60% by weight of zinc, and from 20 to 40% by weight of aluminum with minor amounts of impurities.

The alloy is conveniently prepared in a shallow titanium well (0.25" x 0.5" dia.) attached to and forming part of an ultrasonic energy coupling bar. A predetermined amount of each of copper, phosphorus-silver alloy, zinc, and aluminum are placed in the well and may be melted beforehand or just preceding the soldering operation by heating and applying ultrasonic energy. The alloy may be prepared by other conventional melting techniques before its use.

The alloy has particular application in the joining of metals and alloys, particularly aluminum, to which brazing is difficult because of the great problem in forming an adherent brazed coating owing to the presence of surface oxides. The invention has also found practical application in the joining of copper-aluminum, copper-constantan, Chromel-Alumel, copper to copper, and stainless steel-stainless steel members. The invention is most useful in uniting aluminum and copper conductors in electrical apparatus such as motors, generators and transformers.

Figure 1:
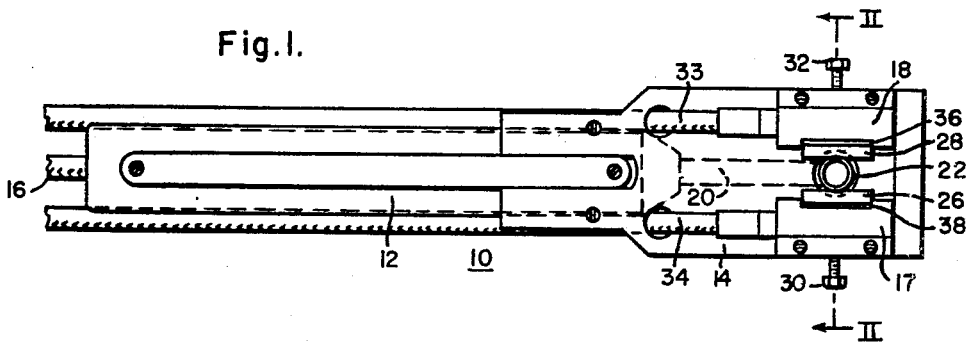
Figure 1 is a top elevation of the soldering device.

This may be accomplished, for instance, by the arrangement shown in Figure 1 of the drawing.

A soldering device assembly 10 comprises a magnetostrictive transducer 12 supporting an inorganic insulating base 14, for example a lead borate glass and mica material, which houses two copper clamps 17 and 18 disposed about two stainless steel resistance tabs 36 and 38 which, in turn, are disposed about two graphite blocks 26 and 28, which provides the heat to a brazing bath. Power to the magnetostrictive transducer 12 is supplied by means of a high frequency power supply cable from a suitable electrical power supply, and air line 16 thereby inducing sufficient energy so that the transducer may transform this energy into mechanical vibrations to an operably connected titanium rod 20, which, in turn, communicates these vibrations to a titanium bath 22 embodying the brazing alloy of the present invention. The bath 22 is disposed at a full wave length from the transducer 12. The graphite blocks 26 and 28 are resistance heated by means of 60-cycle energy supplied by two power cables 33 and 34. The two stainless steel resistance tabs 36 and 38 promote initial heating. Another function of these stainless steel tabs is to act as a thermal insulator to prevent the copper clamps 17 and 18 from overheating. Adjustments of the tabs, graphite blocks, etc., may be made by means of two adjusting screws 30 and 32.

Figure 2:
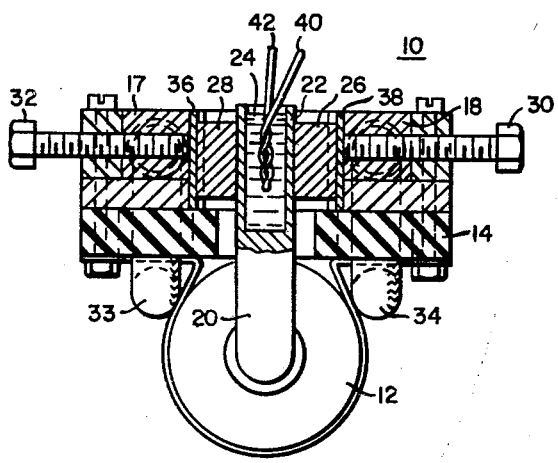
Fig. 2 is a vertical cross section through the end of the soldering device.
Figure 3:
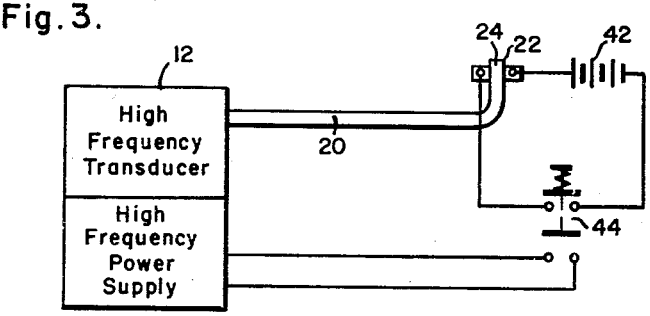
Fig. 3 is a diagrammatic representation of the teachings of the invention.

Members 40 and 42 of a metal or alloy to be brazed, shown as twisted wires in Fig. 2, are dipped into molten metal disposed in bath 22. The brazing alloy comprises approximately 2 to 15% by weight of copper, from 3 to 7% by weight of phosphorus, from 2 to 10% by weight of silver, from 45 to 60% by weight of zinc and from 20 to 40% by weight of aluminum. The brazing process is carried out in the following manner:

Referring to Fig. 3, by depressing a two-stage foot switch 44, the first stage causes 60-cycle current to flow to the bath 22 to rapidly produce a temperature of between 700° and 950° F. at the graphite blocks, thus melting the brazing alloy. After immersing members 40 and 42 for a few seconds in the molten brazing alloy, enamel, if any be present on the members, is decomposed by pyrolysis. At this point the two-stage foot switch 44 is depressed to its second stage thereby activating the transducer which will, in turn, transmit to the operably connected titanium rod 20 high frequency mechanical vibrations of between 9000 and 60,000 cycles per second for a period of time. The high frequency vibrations energize the molten brazing alloy and cause it to cavitate away oxides, organic materials, and enamel pyrolysis products, and the alloy wets the clean metal surfaces. After a coating of said alloy is applied on each of said adjoining surfaces by the joint action of heat and vibration, the joint is removed from the bath and cooled until solidification of the attached brazing alloy film occurs whereby to unite the members 40 and 42 into a unitary structure.

A specific application of this invention may be illustrated by the following example. An alloy comprising 12% by weight of copper, 5% by weight of phosphorus, 5% by weight of silver, 48% by weight of zinc and 30% by weight of aluminum, was melted in the titanium bath of a transducer such as is shown in the drawings at a temperature of about 900° F. Twisted members of enameled aluminum and copper wires were immersed in the molten alloy, thus decomposing the enamel on the surface of the wires after a few seconds of immersion. Ultrasonic energy was then applied for a few seconds to clean the wire surfaces whereupon an adherent thin coating of said alloy was deposited on the members to be joined, after which the twisted members were withdrawn and cooled so that the alloy adherent thereto solidified. The strength and electrical conductivity of the joint were tested and found to be satisfactory.

Pairs of members of other metals and alloys were successfully joined by the method of this example as follows:

Aluminum to aluminum
Copper to copper
Chromel to Alumel
Copper to constantan
Stainless steel to stainless steel It will be understood that the above description and drawing are illustrative and not limiting.

We claim as our invention:

1. An alloy suitable for ultrasonic brazing of metals and alloys, the alloy consisting essentially of 12% by weight of copper, 5% by weight of phosphorus, 5% by weight of silver, 48% by weight of zinc, and 30% by weight of aluminum.

2. An alloy suitable for ultrasonic brazing of metals and alloys, the alloy consisting essentially of from 2 to 15% by weight of copper, from 3 to 7% by weight of phosphorus, from 2 to 10% by weight of silver, from 45 to 60% by weight of zinc, and from 20 to 40% by weight of aluminum.

3. A process for joining metals and alloys which comprises heating members of the metals to be joined to a temperature of from about 700° F. to 950° F., sufficient to melt a brazing alloy consisting essentially of from 2 to 15% by weight of copper, from 3 to 7% by weight of phosphorus, from 2 to 10% by weight of silver, from 45 to 60% by weight of zinc, and from 20 to 40% by weight of aluminum, applying a quantity of said brazing alloy at least to the meeting surfaces of the members to be joined whereby said alloy melts, subjecting the molten alloy to high frequency mechanical vibrations of between 9000 to 60,000 cycles per second for a period of a few seconds to apply a coating of said alloy on each of said joining surfaces, cooling the joint to solidify the applied alloy and to bond the members into a unitary structure.

4. The process of joining members composed of metals and alloys melting above 950° F., the steps comprising, heating a body of a brazing alloy to a temperature of about 700° F. to 950° F. sufficient to melt the brazing alloy, the brazing alloy consisting essentially of from 2 to 15% by weight of copper, from 3 to 7% by weight of phosphorus, from 2 to 10% by weight of silver, from 45 to 60% by weight of zinc, and from 20 to 40% by weight of aluminum, dipping members having surfaces to be joined into the molten brazing alloy while subjecting said brazing alloy to high frequency mechanical vibrations of between 9000 and 60,000 cycles per second for a brief period of time whereby to apply a coating of said alloy on each of said joining surfaces, cooling the coated joint, and allowing the alloy coating to solidify and join the members into a unitary structure.

References Cited in the file of this patent

UNITED STATES PATENTS

| | | |
|---|---|---|
| 485,017 | Ries | Oct. 25, 1892 |
| 2,272,391 | Anderson et al. | Feb. 10, 1942 |
| 2,272,393 | Anderson et al. | Feb. 10, 1942 |
| 2,344,589 | Bogner | Mar. 21, 1944 |
| 2,397,400 | Barwich | Mar. 26, 1946 |
| 2,426,650 | Sivian | Sept. 2, 1947 |
| 2,737,712 | Larson | Mar. 13, 1956 |
| 2,778,099 | Anderson | Jan. 22, 1957 |
| 2,824,543 | Brown | Feb. 25, 1958 |
| 2,833,238 | Jones et al. | May 6, 1958 |

OTHER REFERENCES

Aluminum Soldering, Supplement to the Journal of the American Welding Society, Sept. 1940, p. 315-S.